United States Patent
Bianchi (10) Patent No.: US 6,525,495 B2
(45) Date of Patent: Feb. 25, 2003

(54) ELECTRONIC DEVICE FOR CONTROLLING THE ELECTROMAGNETIC SELF-BRAKING CURRENT IN REVERSIBLE ROTATING ELECTRIC COMMUTATOR MACHINES

(76) Inventor: Gianpietro Bianchi, Via Nazionale, 21-Cedegolo (BS) (IT)

(*) Notice: Subject to any disclaimer, the term of this patent is extended or adjusted under 35 U.S.C. 154(b) by 0 days.

(21) Appl. No.: 09/846,240

(22) Filed: May 2, 2001

(65) Prior Publication Data

US 2001/0038273 A1 Nov. 8, 2001

(30) Foreign Application Priority Data

May 8, 2000 (EP) .............................................. 00830336

(51) Int. Cl.[7] .................................................. H02P 3/06
(52) U.S. Cl. ........................ 318/381; 318/245; 388/849
(58) Field of Search .................................. 318/244, 245, 318/268, 269, 375, 379, 380, 381; 388/842–860, 937

(56) References Cited

U.S. PATENT DOCUMENTS

| | | | | |
|---|---|---|---|---|
| 3,628,112 A | * | 12/1971 | Gross | 318/258 |
| 3,794,898 A | * | 2/1974 | Gross | 318/380 |
| 3,965,404 A | * | 6/1976 | Petersen | 318/261 |
| 4,144,482 A | * | 3/1979 | Schwab | 318/381 |
| 6,013,993 A | * | 1/2000 | Barbisch | 318/379 |

FOREIGN PATENT DOCUMENTS

| | | |
|---|---|---|
| DE | 35 11 894 | 10/1986 |
| DE | 36 36 555 | 5/1988 |
| DE | 40 22 637 | 1/1992 |
| DE | 42 01 023 | 7/1993 |
| EP | 0 551 909 | 7/1993 |

* cited by examiner

Primary Examiner—Bentsu Ro
(74) Attorney, Agent, or Firm—Nixon & Vanderhye, P.C.

(57) ABSTRACT

The present invention regards an electronic device for controlling the electromagnetic self-braking current in reversible rotating electric commutator machines, fitted with an inductor winding and an armature winding, in which there are reversing means to control the functioning of the electric machine as a generator by mutual inversion of the polarity of said inductor winding and said armature winding. The device includes a switchable current control circuit and an excitation circuit distinct from each other. The control circuit includes an electric load, a power device for connecting and disconnecting said electric load in series in the input circuit of said inductor winding to dissipate the power produced by said electric machine when it functions as a generator, and a variable duration pulse generator for controlling the switching of said power device. The excitation circuit includes voltage generator means for generating, at the moment of reversing the machine to the function as generator, a pre-set sign voltage to cause the self-excitation of the machine for functioning as a generator and, as a consequence of said self-excitation, the activation of said variable duration pulse generator for switching said power device to the conditions of connecting and disconnecting said electric load.

11 Claims, 6 Drawing Sheets

ELECTRONIC DEVICE FOR CONTROLLING THE ELECTROMAGNETIC SELF-BRAKING CURRENT IN REVERSIBLE ROTATING ELECTRIC COMMUTATOR MACHINES

DESCRIPTION

The present invention relates to an electronic device for the control of electromagnetic self-braking current in reversible rotating electric commutator machines, in particular for electric machines with series excitation, generally indicated as "Universal Motor".

It is known that electric rotating commutator machines can be made to function as generators, even if only for a limited time, that is they can invert from electric motors to generators.

This method of functioning is considerably interesting for various types of industrial applications and amongst these the most interesting is the possibility of creating controlled electromagnetic self-braking in motors for electric tools.

Nevertheless, when the operation of functioning reversal from motor to generator in short circuit is carried out, a rapid current transient is created, lasting a few tenths of a millisecond, which however reaches peak values of intensity in the order of hundreds of Amperes. Such a high value causes irreversible damage to the components of the electric machine and in particular the commutator, the brushes and the windings suffer irrevocable damage.

In view of the state of the art described, the object of the present invention is to make an electronic device which can control the current circulating in the electric machine windings and keep the value of said current constant for the whole period needed for the machine to brake.

According to the present invention, such object is reached by means of an electronic device for the control of the self-braking current in reversible rotating electric commutator machines, fitted with an inductor winding and an armature winding, including reversing means for controlling the functioning of said electric machine as a generator by mutual reversal of the polarity of said inductor winding and said armature winding, characterised in that it includes a switchable current control circuit and an excitation circuit, distinct from each other, said control circuit including an electric load, a power device for connecting and disconnecting said electric load in series in the input circuit of said inductor winding to dissipate the power produced by said electric machine when it functions as a generator, and a variable duration pulse generator for controlling the switching of said power device, and said excitation circuit including voltage generator means for generating, at the time of reversing the machine to function as a generator, a pre-set sign voltage to cause the self-excitation of the machine for its functioning as a generator and, in consequence to said self-excitation, the activation of said variable duration pulse generator for switching said power device to the conditions of connection and disconnection of said electric load.

Thanks to the present invention a device for the control of the electromagnetic self-braking current in reversible rotating electric commutator machines can be made, which, through the use of a pilotable switchable control circuit which connects and disconnects an electric load, such as a resistance or other device, in series with the inductor winding, dissipates in heat all or nearly all the power produced by the machine when functioning as a generator. The current in the circuit including the inductor winding and the armature winding is thus kept constant and causes no damage to the machine functioning as a generator. In addition, said constant current creates in consequence a constant electromagnetic torque on the rotor of the machine.

It must also be noted that the technique of controlling the current with a switching power device in parallel with the electric load permits transfers of very high power with reduced dimension, reasonably priced and high efficiency electronics, that is with quite limited thermal dispersion.

Another important effect of the use of a switchable control circuit consists in the limited consumption in stand-by condition, which, with adequate dimensioning of the components, permits the functioning capacities of the control circuit to be kept for several seconds after the disconnection from the mains supply.

The excitation circuit activates the self-excitation of the machine and then the switching of the power device included in the current control circuit for the connection and disconnection of the electric load in series with the inductor winding. Said excitation circuit uses for this purpose an electric voltage pulse generated to enable the self-excitation of the machine and, with it, the activation of the variable duration pulse generator for switching the power device to electric load connection and disconnection conditions.

In substance the excitation circuit carries out the theoretic function of a generator of pulse voltage with adequate internal impedance. The pulse produced by this generator starts at the time the current reverser of the electric machine is commutated and lasts for several milliseconds, after which the generator excludes itself.

The control device according to the invention has turned out to be particularly suitable for electric machine that can be reversed from motor to generator. Its use is also foreseeable in different contexts, for example for controlled electromagnetic brakes.

The characteristics and advantages of the present invention will result evident from the following detailed description of embodiments thereof, illustrated as non-limiting examples in the enclosed drawings, in which.

Figure 1:
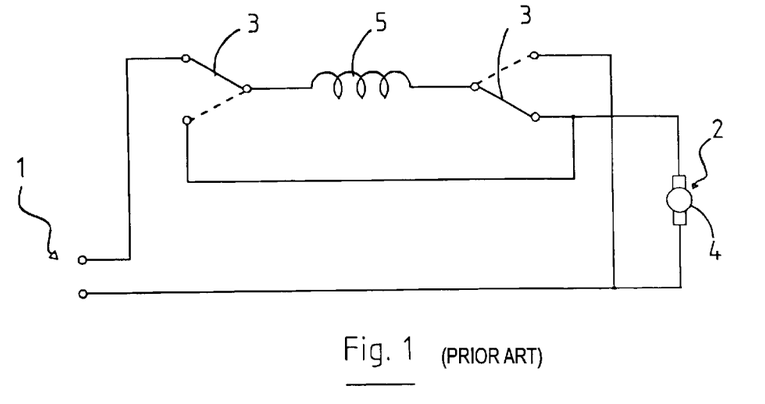
FIG. 1 shows an electric supply diagram of an electromagnetic self-braking electric machine according to the known art.

The conventional electric diagram illustrated in FIG. 1, exemplarily, directed to an electric machine that can be commutated from motor to generator, provides for a couple of terminals 1, from which a 220–230 AC supply voltage can be obtained for an electric commutator machine 2 with series excitation, including an inductor winding 5 and a rotor or armature winding 4, and a bipolar reverser 3 for reversing the electric machine 2 from motor to generator or vice versa by reversing the polarity of the inductor winding 5 with respect to the armature winding 4.

In the solid line representation, the two poles of reverser 3 are in the position that determines the functioning as motor of the electric machine, while in the dotted line representation, they are in the position that determines the functioning as generator in short circuit and the consequent braking of the electric machine 2.

In the latter position the effect that is produced in the electric machine 2, that is when the inversion of function is made from motor to generator in short circuit, is the generation of a rapid current transient, which lasts few tenths of a millisecond, but which reaches peak values to the order of several hundreds of Amperes, causing irreparable damage to the commutator, the brushes and the windings of electric machine 2. For a most detailed operational description of the electric diagram in FIG. 1 see the more common technical-scientific texts.

Figure 2:
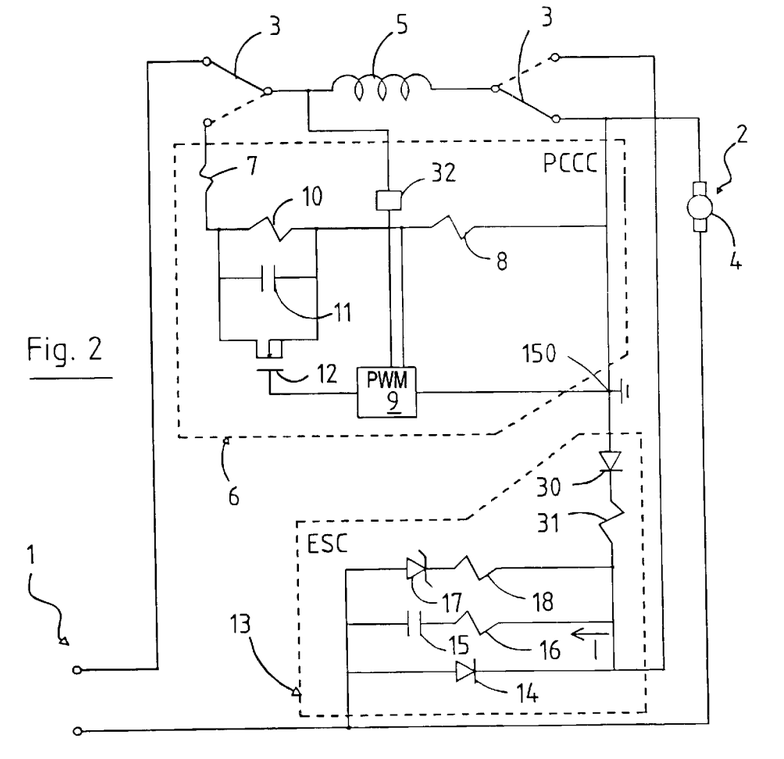
FIG. 2 shows an electric diagram of an electromagnetic self-braking electric machine fitted with a current control device according to a first embodiment of the present invention.

FIG. 2 shows the corresponding electric diagram of a first embodiment of a self-braking current control device according to the present invention.

According to what is shown in said figure, a current control electronic circuit 6, also called PCCC circuit, is placed in series with the inductor winding 5 to carry out the control of the current circulating in the same inductor. The above electronic circuit 6 includes the parallel of a braking resistor 10, of a power transistor 12 (also replaceable with another suitable electronic power switch) and of a capacitor 11 for protecting said transistor 12 against strong voltage gradients, and a variable duration pulse generator circuit 9 of the type PWM (Pulse Width Modulation), capable of timing the switchings of the power transistor 12. A pre-loading device 32, which obtains power from the inductor winding 5, is associated with the generator PWM 9.

Circuit 6 also includes a fuse 7 for protection from overcurrents, which in this case is a fuse with the value of 12A, and a resistor 8 called "sensing", for measuring the current that flows in the windings 5 and 4 so as to activate the generator PWM 9 for switching the power device 12.

In the diagram there is an excitation circuit 13, also called ESC circuit, for generating a short pulse voltage, enough for the auto-excitation of the electric machine at the time of reversing from motor to generator. The excitation circuit 13 consists of the parallel of a power diode 14, of a preload capacity 15 in series with a resistor 16, and of a Zener diode 17 in series with a resistor 18, all connected in series with a resistor 31 and a diode 30.

The circuit diagram in FIG. 2 basically consists of two distinct circuits, respectively the control circuit 6 and the excitation circuit 13, having a common ground point 150. Said two circuits act on two independent branches of the inversion diagram of the inductor winding 5 with respect to the armature winding 4.

When the electric machine 2 functions as a motor, which happens with the reverser 3 in the position illustrated with a solid line in FIG. 2, the excitation circuit 13 preloads, shunting from the armature winding 4 a current I of a few milliAmperes, which loads the capacitor 15. In turn the device 32, shunting the preload current from the inductor winding 5, preloads, feeding the generator PWM 9. The shunting of these currents is insignificant for the operation of the electric machine 2 as the currents are of a moderate value.

When the reverser 3 moves to the position illustrated with the dotted line in FIG. 1, a short pulse voltage is generated because of the discharge of the capacitor 15 through resistor 16 in series with the windings 5 and 4 of machine 2. After a brief transient, this pulse discharge voltage is able to generate a unidirectional current in machine 2 which can excite minimally machine 2, then to trigger the self-excitation and finally to start up the machine 2 as generator.

The discharge current of capacitor 15, thus generated, must be unidirectional and so that this happens it is indispensable, on the basis of the differential equations that control RCL resonant circuits, that:

$$(R_{16}+R_{WD}) >= 2\sqrt{L_{WD}/C_{15}}$$

where $R_{16}$ is the value of the resistor 16, $C_{15}$ is the capacitance value of the capacitor 15, RWD indicates the total series resistance of the windings 5 and 4 and has a very low value and $L_{WD}$ identifies the total series inductance of the windings 5 and 4.

When a voltage is generated in the brushes of electric machine 2 and therefore the self-generated current starts to circulate in the windings, circuit 13 has zero impedance, that is it assumes a short circuit configuration, having the power diode 14 in antiparallel.

Therefore, circuit 13 operates as a generator of pulse voltage with adequate impedance. The pulse that is produced by the voltage generator starts at the time the reverser 3 is reversed, lasts a few milliseconds, that is the discharge time of the series of the capacitor 15 and the resistor 16, and in conclusion, closing through the power diode 14, the voltage generator is put in short circuit.

In an alternative embodiment, the pulse voltage generator can be different from a pre-loaded capacitor. Other embodiments, besides that illustrated in FIG. 2, can be adopted for creating the voltage pulse suitable for triggering the self-excitation of machine 2, as for example using piezoelectric crystals or rechargeable batteries with a suitable voltage.

Circuit 6 has the characteristic of having a moderate consumption of current when the electric machine 2 functions as a motor because the power transistor 12 is on but is connected to an interrupted branch, and therefore does not dissipate current. With adequate sizing of the preload device 32 it is also possible to extend the operating running of the circuit for a few seconds after the disconnection of the machine 2 from the electric mains 1.

Once circuit 13 has generated the voltage pulse for exciting machine 2 circuit 6 intervenes, carrying out the control of the current flowing in the windings 5 and 4, generating signals of the type ON/OFF for the power transistor 12, in parallel with the resistor 10.

Therefore the control of the current is carried out by means of switching transistor 12 which, when OFF, that is with transistor 12 open, permits the connection of resistor 10, which is capable of dissipating in heat, by Joule effect, the power produced by the machine 2 when functioning as a generator while, when ON, that is with transistor 12 closed, the resistor 10 is in short circuit.

In this manner, the control circuit 6 keeps the current constant, preventing said current from causing damage to machine 2 functioning as a generator.

Figure 3:
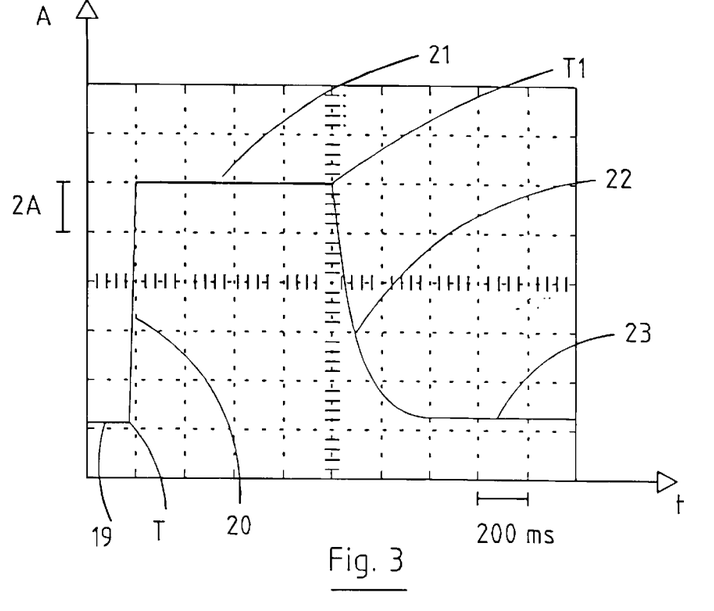
FIG. 3 shows an experimental graph of the electric behaviour of a control device according to the present invention.

In FIG. 3 an experimental graph is shown in which the X-axis indicates time expressed in milliseconds and the ordinate axis indicates current expressed in Amperes.

FIG. 3 shows the image, taken from an oscilloscope, of the current controlled during a braking carried out on a 2500 W electric tool including the relative inertial load.

It can be noted that in a first step 19, during which the electric machine 2 functions as a motor, at an instant T, in which reverser 3 is inverted, that is when the functioning of machine 2 is inverted, a rapid current transient 20 is generated, which lasts a few tenths of a millisecond with peak values of about ten Amperes, current that flows in the inductor winding 5 and in the armature winding 4. During the step 19 the capacitor 15 of circuit 13 preloads sinking current from winding 4 and in the instant T the charge accumulated in capacitor 15 is capable of exciting the machine 2; said machine 2 self-excites and then starts up as a generator. Because of the passage of current through the "sensing" resistor 8, device 6 enters into action and controls the value of the flowing current, dissipating in heat the power produced with resistor 10, and controlling power device 12 through generator 9, so as to keep the current in the circuit within a threshold 21.

Starting from instant T1 the current lessens, line 22, and then the machine 2 stops, line 23, without any damage being made to its components.

Figure 4:
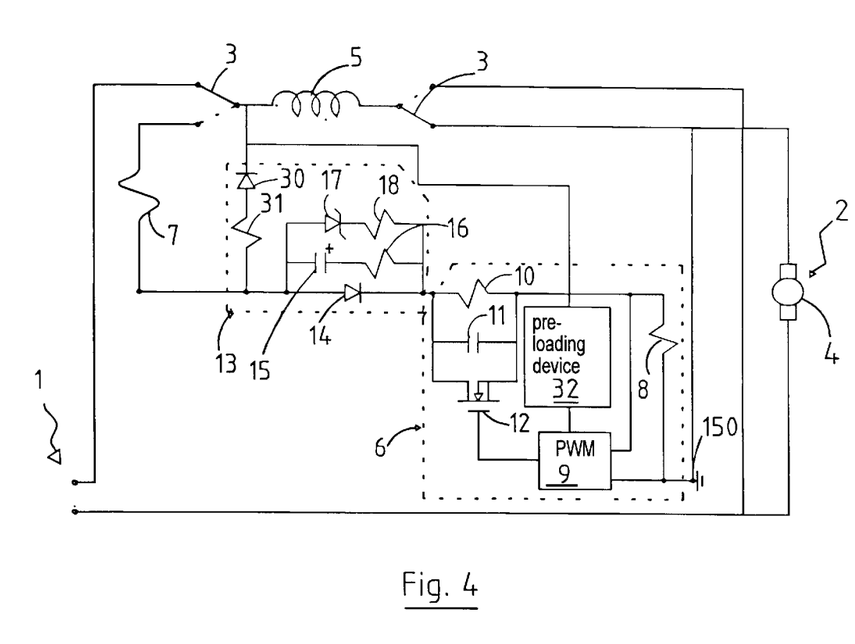
FIG. 4 shows an electric diagram of a second embodiment of the present invention.

In FIG. 4 an electric diagram of a second embodiment according to the present invention is shown.

According to what is shown in said figure it can be noted that the only difference between FIG. 2 is the positioning of the excitation circuit 13. In fact in this representation circuit 13 is placed between the fuse 7 and the control circuit 6.

The operating principle remains identical but there is an additional advantage that the whole device is presented as one single element with three terminals, therefore three-wire cabling is sufficient.

It should also be noted that, while the circuit diagram of FIG. 2 is suitable for electric machines both at direct current and alternating current, that in FIG. 4 is suitable only for machines at alternating current.

In the figures from 5 to 14, in which the same numbers correspond to similar electric circuits, illustrations are made of embodiments with different methods of connecting the control device according to the present invention.

Figure 5:
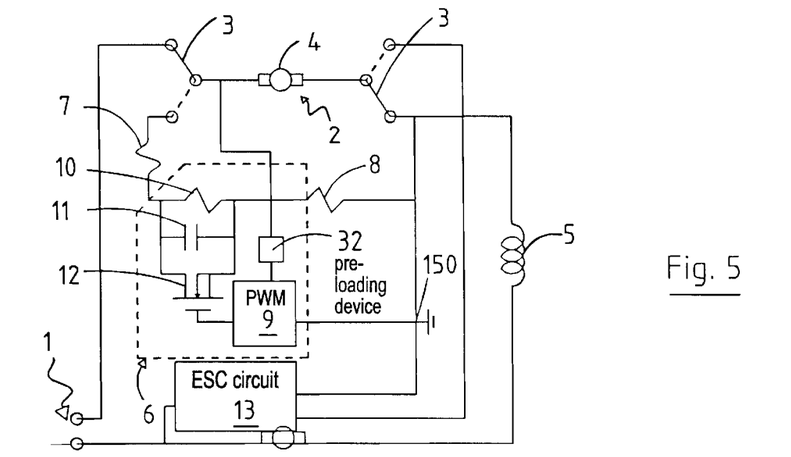
FIG. 5 shows a third embodiment of the present invention.

In particular, in FIG. 5 a different positioning of the armature winding 4 in relation to the inductor winding 5 can be seen, with inverted connection of the circuits 6 and 13 in comparison to the diagram illustrated in FIG. 2.

Figure 6:
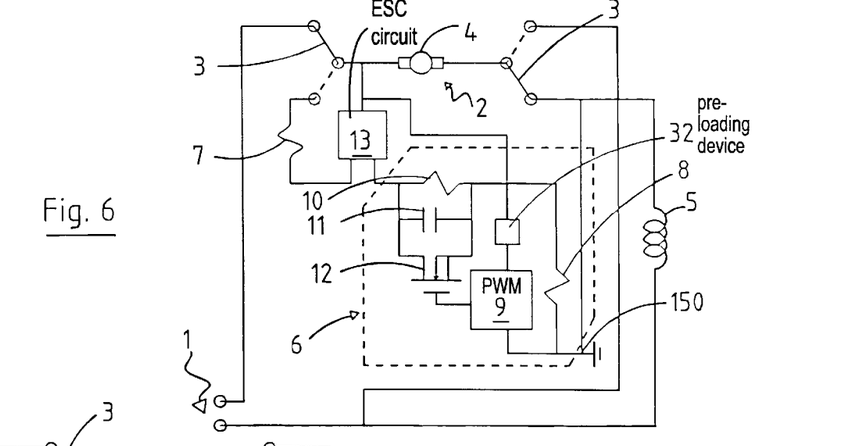
FIG. 6 shows a fourth embodiment of the present invention.

In FIG. 6 positioning of the armature winding 4 in relation to the inductor winding 5 is shown, with inverted connection of the circuits 6 and 13 in comparison to the diagram illustrated in FIG. 4.

Figure 7:
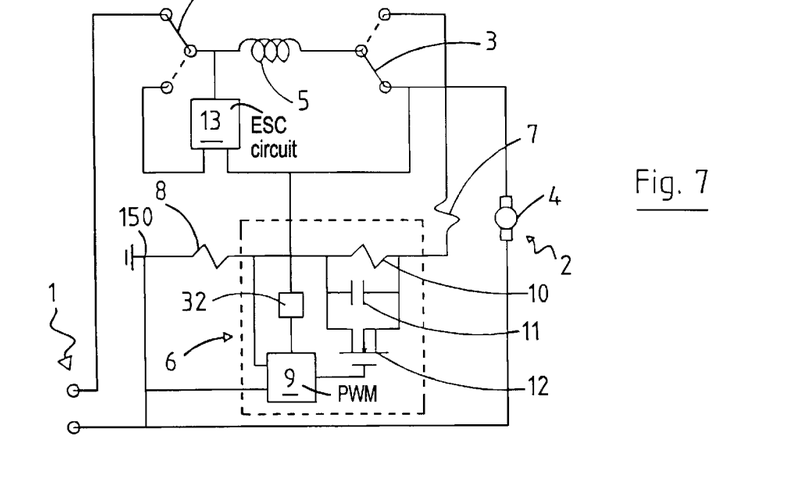
FIG. 7 shows a fifth embodiment of the present invention.

In FIG. 7, the connection of circuits 6 and 13 is shown in the position to preload, respectively, with the armature winding 4 and with the inductor winding 5.

Figure 8:
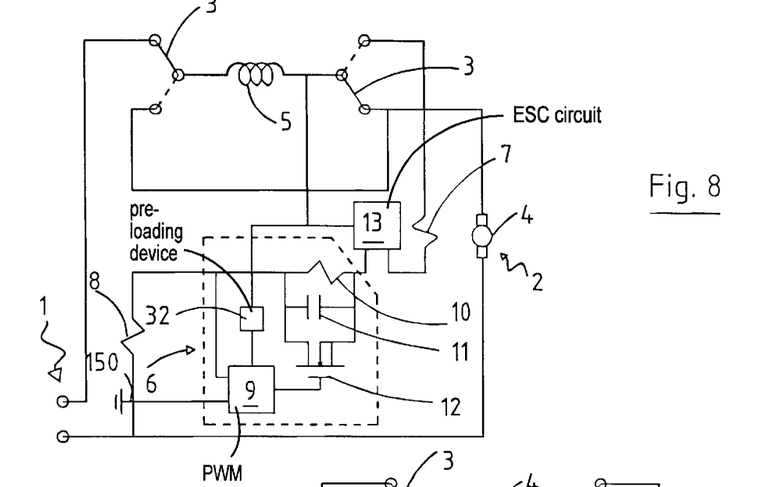
FIG. 8 shows a sixth embodiment of the present invention.

In FIG. 8 the connection of the circuits 6 and 13 is shown in positions to both preload with the armature winding 4.

Figure 9:
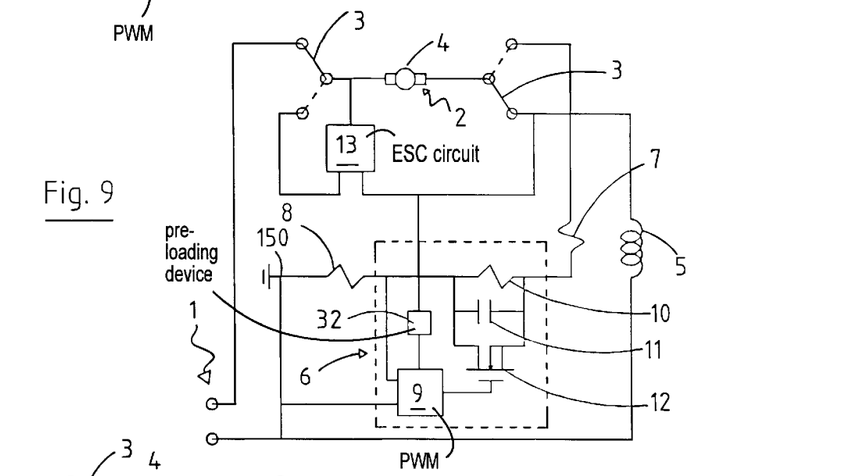
FIG. 9 shows a seventh embodiment of the present invention.

In FIG. 9 the inverted connection of the windings 5 and 4 is represented in comparison to FIG. 7.

Figure 10:
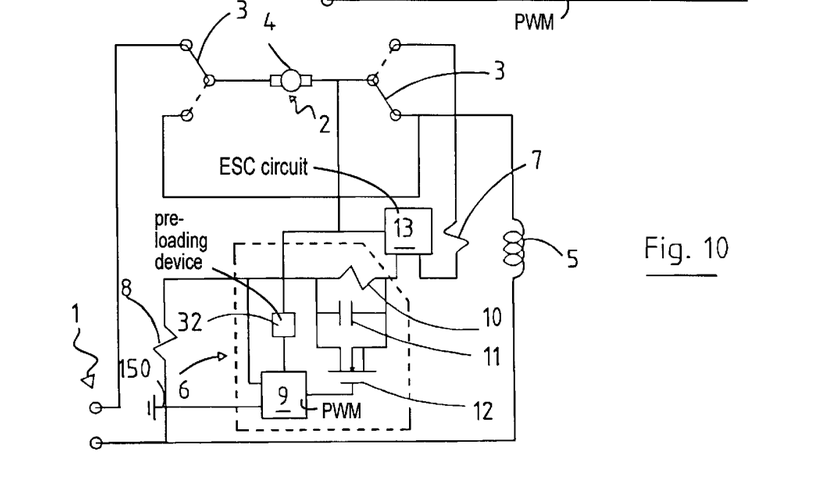
FIG. 10 shows an eighth embodiment of the present invention.

In FIG. 10 the inverted connection of the windings 5 and 4 is represented in comparison to FIG. 8.

Figure 11:
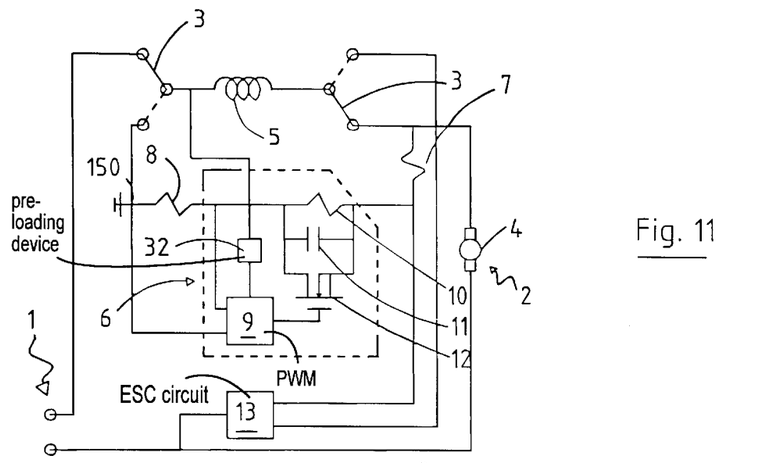
FIG. 11 shows a ninth embodiment of the present invention.

In FIG. 11 a circuit diagram is shown similar to that in FIG. 2, except that the direction of the braking current is inverted.

Figure 12:
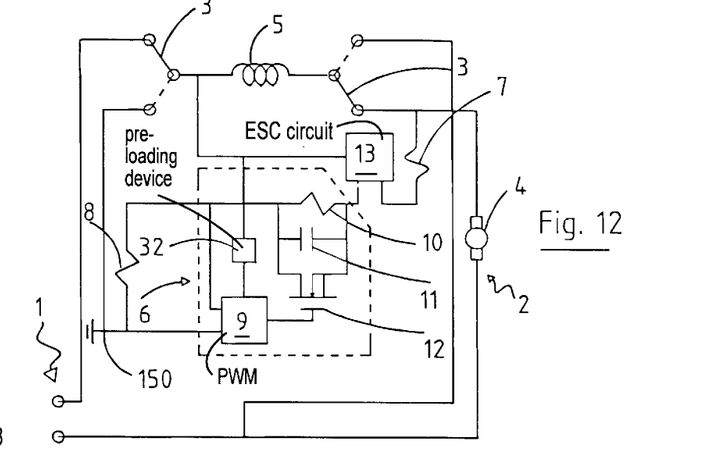
FIG. 12 shows a tenth embodiment of the present invention.

In FIG. 12 a circuit diagram is shown similar to that in FIG. 4, except that the direction of the braking current is inverted.

Figure 13:
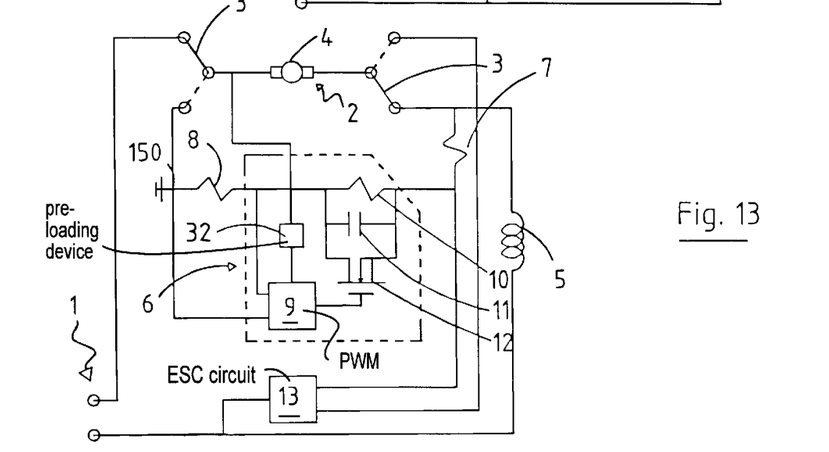
FIG. 13 shows a eleventh embodiment of the present invention.

In FIG. 13 a circuit diagram is shown similar to that in FIG. 5, except that the direction of the braking current is inverted.

Figure 14:
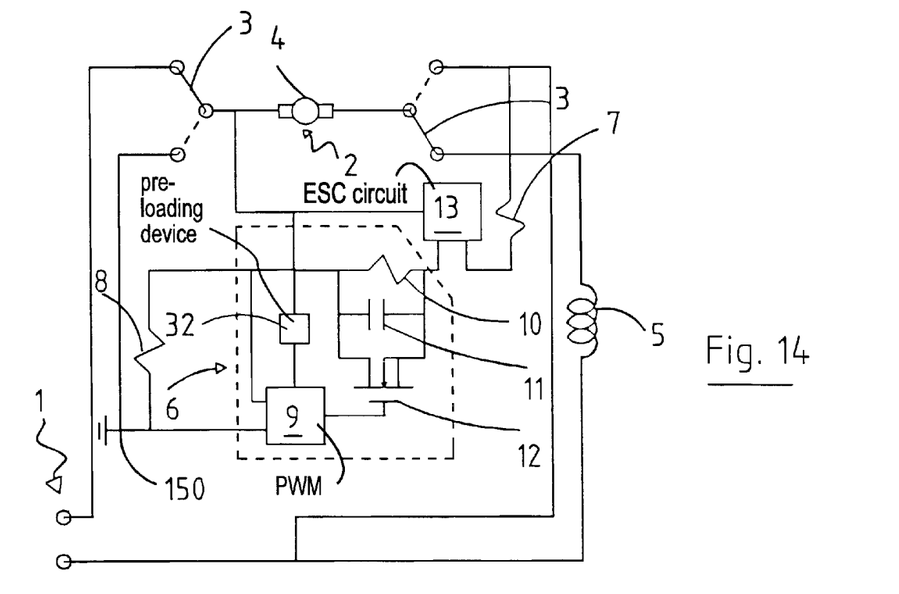
FIG. 14 shows a twelfth embodiment of the present invention.

In FIG. 14 a circuit diagram is shown similar to that in FIG. 6, except that the direction of the braking current is inverted.

For the various different embodiments shown in the figures from 5 to 14 an exchange of polarity of both the inductor winding and armature winding can be made of electric machine 2.

Naturally, all the examples shown in the drawings or however coming within the following claims can be executed not only with discrete components, but also in the form of one single integrated chip, of course with the exception of the power components such as for example the capacitors 11 and 15 and the resistor 10.

What is claimed is:

1. Electronic device for controlling the electromagnetic self-braking current in reversible rotating electric commutator machines, fitted with an inductor winding and an armature winding, including reversing means for controlling the functioning of the electric machine as generator by mutual inversion of the polarity of said inductor winding and said armature winding, characterised in that it includes a switchable current control circuit and an excitation circuit distinct from each other, said control circuit including an electric load, a power device for connecting and disconnecting said electric load in series in the input circuit of said inductor winding to dissipate the power produced by said electric machine when it functions as a generator, and a variable duration pulse generator for controlling the switching of said power device, and said excitation circuit including voltage generator means for generating at the moment of reversing the machine to function as a generator, a pre-set sign voltage capable of causing the self-excitation of the machine for its functioning as a generator and, as consequence of said self-excitation, the activation of said variable duration pulse generator for switching said power device to the conditions of connecting and disconnecting said electric load.

2. Electronic device according to claim 1, characterised in that said power device consists of a transistor operating as switch, placed in parallel to said electric load.

3. Electronic device according to claim 1, characterised in that said electric load is of resistive type.

4. Electronic device according to claim 1, characterised in that said excitation circuit consists of the parallel of a power diode, of a pre-load capacitor in series with a resistor and a Zener diode in series with a resistor, all connected in series with a diode and a resistor.

5. Electronic device according to claim 1, characterised in that said control circuit and said excitation circuit are placed so that they both preload with said inductor winding.

6. Electronic device according to claim 5, characterised in that said excitation circuit is placed between the inductor winding and the control circuit.

7. Electronic device according to claim 1, characterised in that said control circuit and said excitation circuit are placed so that they both preload with said armature winding.

8. Electronic device according to claim 7, characterised in that said excitation circuit is placed between the inductor winding and the control circuit.

9. Electronic device according to claim 1, characterised in that said control circuit and said excitation circuit are placed so that they respectively preload with said inductor winding and said armature winding.

10. Electronic device according to claim 1, characterised in that said control circuit and said excitation circuit are placed so that they respectively preload with said armature winding and said inductor winding.

11. Electronic device according to claim 1, characterised in that the control circuit and the excitation circuits are made substantially in one single chip with integrated circuit.

* * * * *